United States Patent [19]

Smith

[11] Patent Number: 4,869,517
[45] Date of Patent: Sep. 26, 1989

[54] ROUGH TERRAIN CART

[76] Inventor: Philip D. Smith, 8354 Thunderhead Dr., Boulder, Colo. 80302

[21] Appl. No.: 227,819

[22] Filed: Aug. 3, 1988

[51] Int. Cl.⁴ .............................................. B62B 1/10
[52] U.S. Cl. ................................................. 280/47.3
[58] Field of Search ...................... 280/47.13 R, 47.19, 280/47.17, 47.2, 47.3, 47.32, 78, 202, 652, 289 A, 5.2, 5.24; 224/32 R, 32 A

[56] References Cited

U.S. PATENT DOCUMENTS

| | | | |
|---|---|---|---|
| 2,263,879 | 11/1941 | Jorgensen | 280/5.24 |
| 2,504,412 | 4/1950 | Hartman | 97/59 |
| 2,918,296 | 12/1959 | Goodale | 280/41 |
| 2,979,338 | 4/1961 | Dwyer | 280/47 |
| 2,992,834 | 7/1961 | Tidwell et al. | 280/47.3 |
| 3,034,801 | 5/1962 | Huston | 280/37 |
| 3,236,537 | 2/1966 | Eckman | 280/47.18 |
| 3,456,959 | 7/1969 | Hemphill et al. | 280/47.3 |
| 3,820,807 | 6/1974 | Curran | 280/47.3 |
| 4,444,405 | 4/1984 | Barrus | 280/47.3 |

FOREIGN PATENT DOCUMENTS 54114  10/1942  Netherlands ........................ 280/47.3

Primary Examiner—Kenneth R. Rice
Assistant Examiner—Richard Camby
Attorney, Agent, or Firm—Dorr, Carson, Sloan & Peterson

[57] ABSTRACT

A cart for the transport of a workload over rough terrain. The cart has a low center of gravity, to make heavy loads easier to carry, a bumper that protects the cart against obstacles, a waistband extending between handlebars to provide for increased user comfort in pushing the cart, and diagonally inclined struts interconnecting the handlebar portion of the frame with the top and bottom load carrying elements of the frame.

9 Claims, 2 Drawing Sheets

ROUGH TERRAIN CART

FIELD OF THE INVENTION

This invention relates to a cart, and more particularly, to a cart that is intended for use in hiking, backpacking, camping, and the like to facilitate the transportation of heavy loads over narrow trails and rough terrain.

BACKGROUND OF THE INVENTION

It is known to use pushcarts and the like for the purpose of transporting heavy loads. Carts of this type are shown in the following U.S. Pat. Nos.: 2,979,338 to A. J. Dyer, 2,992,834 to E. A. Tidwell et al., 3,034,801 to B. W. Huston, 3,236,537 to A. J. Eckman, 3,456,959 to T. E. Hemphill et al., 3,820,807 to T. W. Curran, and 4,444,405 to D. M. Barrus. These patents disclose carts having one wheel and which are intended for use in facilitating the transportation of heavy loads over rough terrain. These carts are used as a substitute for conventional backpacks since they permit heavier loads to be carried with greater ease. A typical one wheel cart can easily accommodate a load of one or two hundred pounds when hiking in mountains, forests, and other situations in which rough terrain is encountered.

The popularity of hiking and camping and the foregoing availability of a multitude of items for enhancing the comfort of trips into recreational areas creates problems regarding the transport of supplies into remote areas. The common practice is to carry all such supplies in backpacks or where available on pack animals. Backpacks have been improved to the extent that they can be used to support larger loads. However, the weight of the supplies is still supported by the hiker. This is burdensome and often constitutes a limitation on the distances which can be travelled with comfort over a given period of time. Pack animals can be used to transport heavier loads. However, they must be fed and are expensive to rent or care for. In some areas, they are not allowed.

The presently available carts have found only limited use due to their design deficiencies. Some of the carts are cumbersome and are often more of a hindrance than a help for use in rough terrain. The presently available carts which are relatively easy to maneuver are not able to carry sufficient loads to make their use worthwhile. Some of the carts have insufficient rigidity or stability. Others have an excessively high center of gravity which reduces their usefulness in carrying heavy loads. Other carts have designs which permit their wheels to easily become intertwined with brush and tree branches.

An ideal cart would maximizes the volume and weight of the supplies that can be carried. It would further have a high degree of maneuverability, a low center of balance, good stability and an ease of use available when transporting heavy loads. It is currently a problem that a cart having all of these traits is not currently available.

SUMMARY OF THE INVENTION

The present invention overcomes the foregoing discussed problems and provides an advancement in the art by providing a one wheeled cart that permits heavy loads to be transported with improved relative ease over narrow trails and rough terrain. The cart of the present invention has an improved stability provided by a plurality of struts which extend downwardly diagonally from a pair of handlebars to both a top and a bottom part of the frame. The diagonally inclined struts are configured to permit the cart to be pulled backwards over obstructions such as logs and rocks without the wheel becoming enmeshed with the rocks or logs. The cart is further advantageous in that it has a front bumper which extends out beyond the forward extremity of the wheel. This bumper prevents the wheel from becoming entwined with rocks, brush, shrubs and the like.

The cart of the present invention is further advantageous in that it has a low center of gravity and an enhanced stability for use in carrying heavy loads. A low center of gravity is crucially important since it makes the cart easier to use and less likely to tip when heavy loads are carried. The cart also has a waistband which is affixed to and extends laterally between the handlebars. This waistband permits much of the force that is required to push the cart to be provided by the waist of the user. The waistbands thereby relieves much of the load that would otherwise be placed on the user's hands, arms and back. This permits heavier loads to be pushed with greater ease than otherwise would be the case if all of the propelling force were supplied by the user's hands and arms.

In summary, the provision of the cart of the present invention provides a cart that overcomes the above discussed disadvantages of the prior art and thereby provides apparatus which permits heavier loads to be pushed more easily over rough terrain.

BRIEF DESCRIPTION OF THE DRAWING

The above and other advantages and features of the invention may be better understood from a reading of the following description thereof taken in conjunction with the drawing in which.

DESCRIPTION OF A PREFERRED EMBODIMENT

Figure 1:
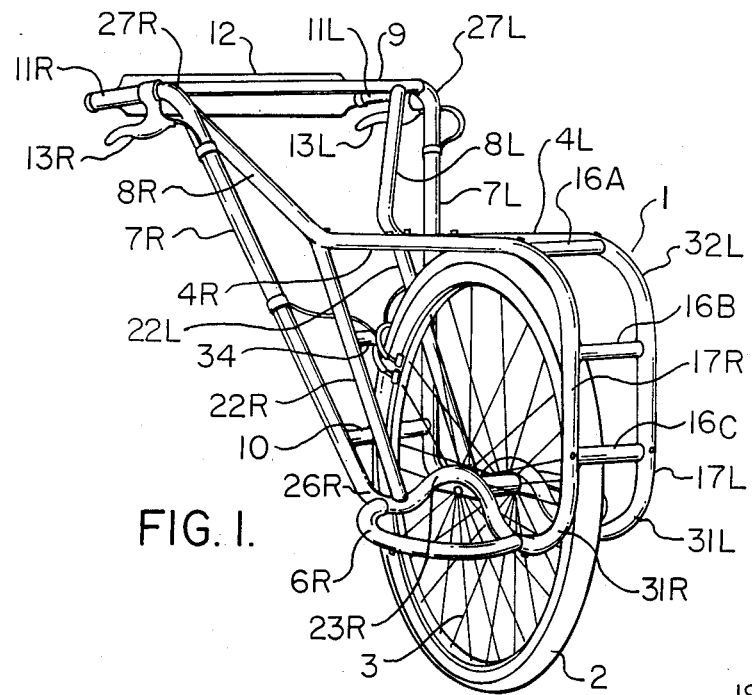
FIG. 1 is a perspective view of a cart comprising one possible exemplary embodiment of the invention.
Figure 3:
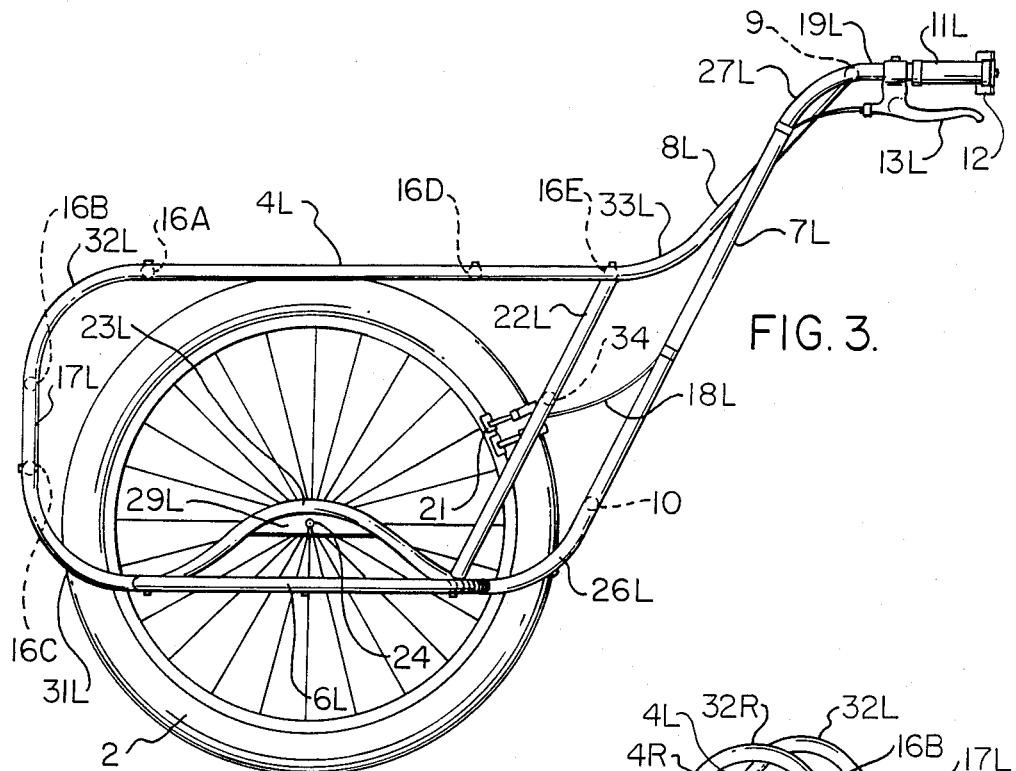
FIG. 3 is a side view of the cart of FIG. 1.

FIG. 1 is a perspective drawing of the cart of this invention and shows a terrain cart having a frame generally designated as 1. The cart further has a bicycle type wheel 2 including spokes 3 and an axle 24 (FIG. 3). The upper rear portion of the cart has a pair of handlebars 11L and 11R. The cart may be utilized to carry heavy loads over rough terrain by attaching thereto packs or any other suitable load carrying device or apparatus as is subsequently described in detail.

The cart basically comprises, a wheel portion including wheel 2, spokes 3, and an axle 24; a load carrying frame portion beginning somewhat below the level of the axle and extending upwards to a position just above the top portion of the wheel; a handlebar portion comprising handlebars 11R and 11L and elements 19L, 19R, 27L and 27R; and diagonally inclined struts 7, 8, and 22 which interconnect the handlebar portion of the frame with the load carrying portion of the frame.

Figure 4:
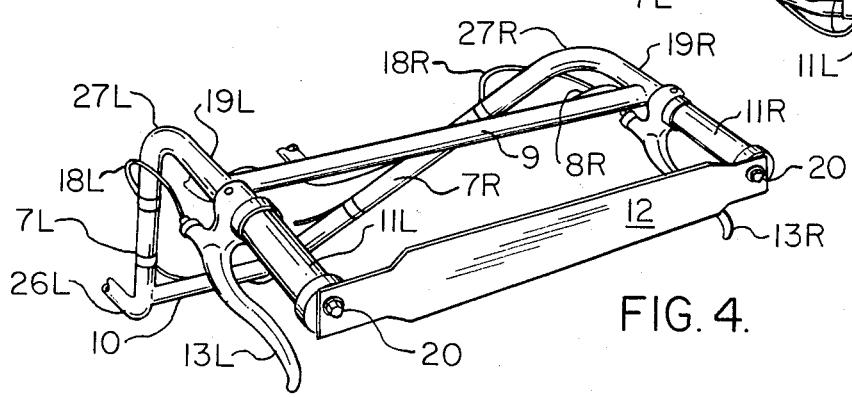
FIG. 4 is a rear perspective view of the handlebar portion of the cart.

On FIG. 4, the handlebar portion of the frame comprises a left handlebar 11L and a right handlebar 11R which are affixed to elements 19L and 19R respectively. Elements 19R and are interconnected by a transverse cross bar 9. A pair of hand operated brake handles 13L and 13R respectively are connected to frame elements 19L and 19R, respectively. The rear vertical faces of handlebars 11L and 11R are connected to a flexible waistband 12 by means of threaded screws 20. The brake handles 13L and 13R are connected by cables 18L and 18R, respectively, to a pair of brakes 21. Waistband 12 enables a user to push the cart with greater ease by using both his waist and his hands to push the cart. The force exerted by a user's waist against waistband 12 lightens the load on the user's hands, arms, shoulders and back and thereby makes it easier to push the cart. This is particularly useful when the cart is pushed forward and upwards on steep inclines.

The cross bar 9 contributes to the stability of the handlebar portion of the frame. The front portion of curved elements 27L and 27R are curved inwardly and downwardly so as to join with the top of struts 7L and 7R which are both downwardly and inwardly inclined.

Figure 6:
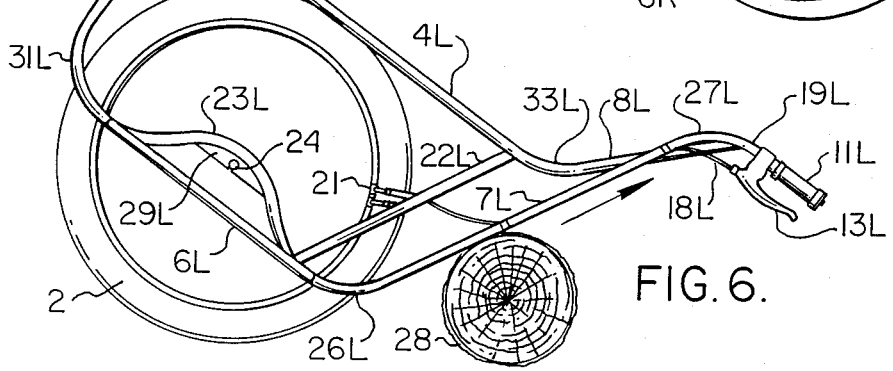
FIG. 6 is a side view of the cart showing the manner in which the rear diagonally extending frame member can be used to pull the cart backwards over obstacles.

As best shown on FIG. 3, strut 7L is essentially straight and extends between upper curved element 27L and a lower curved element 26L. The strut 7L defines a straight line which if projected would be essentially tangential to a rear portion of the circumference of tire 2. As is best shown on FIG. 6, this feature of the frame is advantageous in permitting the cart to be pulled backwards over an obstruction such as a log 28. When such an obstruction is encountered, the frame may be pulled backwards until the mid portion of strut 7L is in contact with the obstruction. At that time, the point at which strut 7L contacts obstruction 28 may be used as a fulcrum to permit the handles 11L and 11R to be pushed downwards so as to lift the forward portion of the cart upwards. At that time, the cart may be pulled backwards further with strut 7 acting as a rail that is slid across the top of the obstruction until tire 2 contacts the obstruction. At the time, tire 2 permits the cart to be rolled over the obstruction until the cart clears the obstruction.

As is best shown on FIG. 3, the bottom end of strut 7L joins with an upper end of a curved frame element 26L which on its lower end joins with a lower frame elements 6L and 23L. Element 6L is at the bottom most level of the frame. As is best shown on FIGS. 1 and 2, element 6L is oblong when viewed from the top and projects outwardly from the frame at its left and right ends. Element 6L, together with its corresponding element 6R on the right side of the frame, is the load bearing element against which the items carried by the frame rest. This is subsequently described in detail.

As best shown on FIG. 3, the bottom end of curved frame element 26L is also connected to a lower rear end of element 23L which is upwardly curved towards its center. The top portion of curved element 23L has a flat plate 29L affixed to its lower surface. This flat plate 29L has a hole for receiving the axle 24 of wheel 2. The axle may be affixed to plate 29L by means of any suitable means such as for example by means of a threaded nut. Curved element 23L projects downwardly on its left and right ends on FIG. 3. On its right end, it joins with curved element 26L as already mentioned. On its forward end it joins with a rear end of curved element 31L.

The forward most end of curved element 31L joins with the bottom of the straight vertically oriented bumper element 17L. Bumper 17L comprises the forward most extremity of the frame. It should be noted that bumper 17L defines a straight line which, if projected downward, would be substantially forward of the front most extremity of tire 2. This aspect of the cart permits bumper 17L to minimize the possibility of wheel 2 being entwined with branches and other obstructions that may be encountered by the cart.

Figure 2:
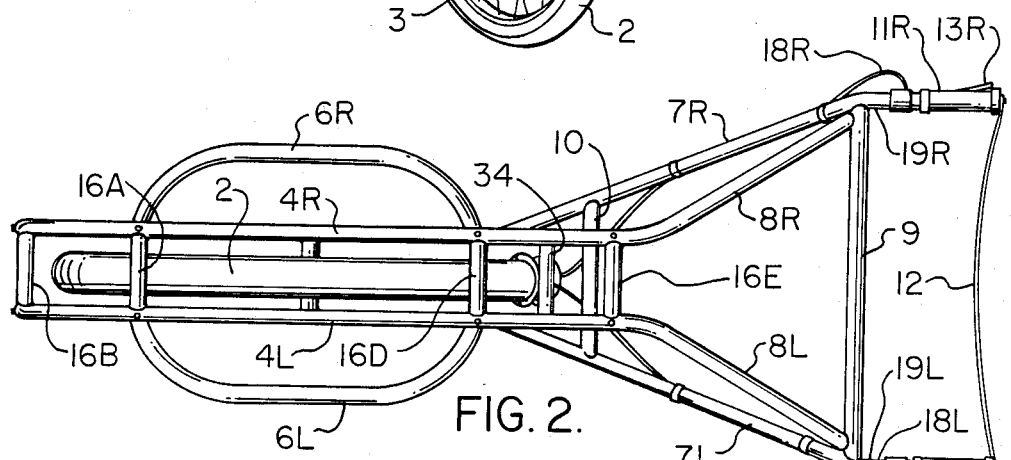
FIG. 2 is a top view of the cart of FIG. 1.

The top end of bumper 17L joins with and end of curved element 32L. The upper end of curved element 32L joins with the front end of the horizontal straight top frame element 4L. Frame element 4L extends from the front to the rear of the frame where it joins with curved element 33L. Curved element 33L connects element 4L and strut 8L. Strut 8L projects upwardly as shown on FIG. 3 with the upper most extremity of strut 8L being connected to the cross bar 9 (FIG. 2). Strut 8L projects diagonally upwardly as shown on FIG. 3 and also projects convergentally insured when viewed from the top rear of the cart as shown on FIG. 2.

Strut 22L, as best shown on FIG. 3, extends diagonally downwards and forward from the intersection of elements 4L and 33L to the intersection of elements 23L and 26L on the bottom portion of the frame. Strut 22L contributes to the overall stability of the frame. The foregoing description of frame with reference to FIG. 3 describes the left portion of the frame when viewed from the rear. The left portion frame elements have the suffix L. The frame also comprises the right side elements which correspond in every detail to the left side elements already described and which have the suffix R. The right side frame elements are best shown on FIGS. 1 and 2.

As is best shown on FIG. 2, the horizontally oriented top frame elements 4L and 4R are connected by the transversely oriented stubs 16A and 16D. These elements, as well as elements 16C and 16E and 16B, provide increased rigidity to the frame. The transversely oriented stub 10 interconnects struts 7R and 7L to provide increased frame rigidity. The transverse stub element 34, shown on FIGS. 1 and 2, joins struts 22L and R to provide increased frame rigidity.

Figure 5:
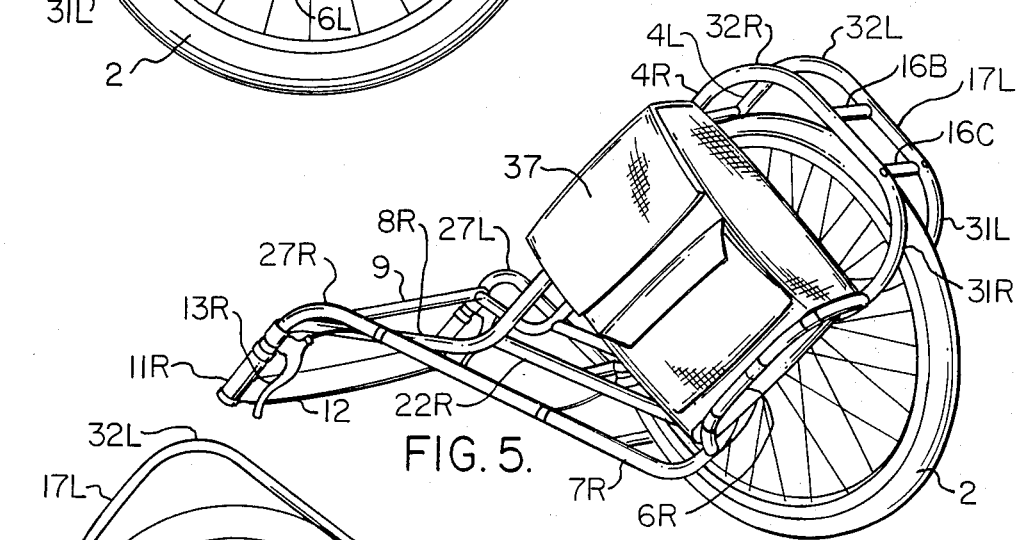
FIG. 5 is a perspective view showing the cart in a resting position.

FIG. 5 discloses the frame of the present invention in its resting position in which the rear ends of handlebars 11R and rest on the ground while the tire 2 provides the resting point for the front portion of the cart. In this position, the cart securely rests against the ground and the spacing between the handlebars provides rigidity against tipping. At this time the weight of the load is transferred to the rear of the cart so that it rests on the two handle bars. FIG. 5 also shows a pack 37 being carried by the cart.

The frame of the present invention provides a number of advantages over the prior art arrangements. First of all, the vertical bumpers 17L and 17R protects the front portion of wheel 2 and minimizes the possibility of the cart and wheel 2 from being intertwined with obstacles such as logs, rocks, shrubs, etc. Another advantage is provided by the diagonally inclined struts 7L and 7R in the rear portion of the frame. These elements are oriented so as to permit the cart to be pulled with relative ease backwards over large objects and obstructions such as a log 28 shown on FIG. 6, as previously described.

Another advantage of the frame of the invention is provided by its low center of gravity. The center of gravity of the frame is lowered by means of the upwardly projecting lower frame elements 23L and 23R. The axle is attached to the plates 29L and 29R affixed to the lower portion of the upper extremity of element 23L and 23R. This lowers the center of gravity of the frame and provides increased motional stability against tipping and the like. As priorly mentioned, a low center of gravity is crucially important when carrying heavy loads.

Another feature of the invention is provided by the use of waistband 12 interconnecting the rear extremities of the handlebars 11L and 11R. Waistband 12 permits a user's waist to provide most of the force that is required to push the cart. This relieves the load on the user's hands, arms and shoulders and back so as to enhance the user's comfort when operating the cart. The user's hands are then primarily used to balance the cart and prevent it from tipping.

Another feature provided by the cart of the present invention is provided by the use of two pairs of diagonally inclined struts to interconnect the load carrying portion of the frame with the handlebar portion of the frame. The first such pair of diagonally inclined struts comprises elements 8L and 8R which, as shown on FIG. 1, interconnect the handlebar portion, of the frame with the top members 4L and 4R of the top load carrying portion of the frame. The second pair of diagonally inclined struts are 7L and 7R. These interconnect the handlebar portion of the frame with the lower portion of the load carrying portion of the frame at elements 26L and 26R. The use of the two different pairs of diagonally inclined struts to interconnect the top and bottom the load carrying elements of the frame provides for greater stability and rigidity. This in turn makes the cart of the present invention easier to use.

The cart of the present invention may be used to carry different types of loads depending upon the requirements of the user. One such possibility is the use of the cart to carry a pack 37 as shown on FIG. 5. In this use, a first pack can be carried on the right side of the cart and a second pack can be carried on the left side of the cart. The bottom of the pack rests on element 6R on the right hand side of the frame while the top portion of the backpack can be tied to element 4R on the upper portion of the right side of the frame. A second pack could concurrently be carried by resting it on the left bottom element 6L and tying its top to the left side horizontal upper element 4L. Another possibility in so far as carrying loads is concerned is the carrying of a load which drapes over the top elements 4L and 4R and extends downward on each side so as to rest on elements 6L and 6R. Other possibilities also exist. A load could be carried that rests entirely upon the top elements 4L and 4R.

It can thus be seen that the cart of the present invention provides a highly usable and desirable cart that overcomes the aforementioned problems and disadvantages of the prior art.

While preferred embodiments of the present invention have been shown, it is to be expressly understood that modifications and changes may be made thereto and that the present invention is set forth in the following claims.

I claim:

1. A light-weight rough terrain cart for carrying loads, said cart having a load carrying frame supported by a single ground-engaging wheel having a rim and a tire and an axle connected to said frame, said frame having a left and a right side and pairs of parallel longitudinally and vertically oriented side members connected by a plurality of transversely oriented members, said frame further comprising:
   a handle bar portion positioned on and comprising an uppermost portion of said frame,
   a pair of handle bars adapted to be grasped by a user and connected to and comprising a rear part of said handle bar portion of said frame,
   a first pair of downwardly convergent struts each defining a straight portion,
   a first pair of curved means for connecting a top end of each of said struts to different sides of a forward end of said handle bar portion,
   a second pair of curved means for connecting a bottom end of each of said struts to a back end of a bottom member on each side of said frame,
   a transversely oriented bar interconnecting said first pair of curved means,
   a second pair of downwardly convergent struts each having a top end connected to said bar near different ends of said bar,
   means connecting a bottom end of each one of said second pair of struts to a rear end of a top load carrying member on each side of said frame, said top load carrying member being positioned below said handle bar portion and above said bottom member on each side, said bottom member on each side of said frame having an upwardly formed portion intermediate front and back ends of said bottom member,
   a vertically oriented plate connected to a lower surface of said upwardly formed portion of each bottom member,
   said axle of said wheel being connected to each of said plates to provide a low center of gravity for said cart, and
   a vertically oriented bumper connected to a front end of said top and bottom members and positioned forwardly beyond the forward extremity of said wheel.

2. The cart of claim 1 in combination with:
   a waist band extending transversely and horizontally between a rear facing vertical surface of each of said handle bars, and
   means for affixing the ends of said waist band to said rear facing surface of each of said handle bars.

3. The cart of claim 1 wherein said straight portion of said first pair of struts each defines a straight line containing a common plane that is essentially tangential to a circumference of said wheel near a rear portion of said wheel so as to facilitate the rearward movement of said cart over obstacles.

4. The cart of claim 3 in combination with brake means affixed to said frame adjacent said wheel and brake engaging means affixed to said handle bars for operating said brake means to inhibit rotation of said wheel.

5. In a cart for carrying loads and having a single ground engaging wheel and a load carrying frame having a left and a right side, said frame further comprising:
   a vertically oriented bumper comprising the forward most element of said frame and positioned forward beyond a forward most extremity of said wheel,
   a handle bar portion of said frame positioned at the rear of said cart and comprising an uppermost level of said frame, a pair of handle bars connected to and comprising a rear part of said handle bar portion and adapted to be grasped by the hands of a user, a lower most portion of said frame comprising a horizontal left side bottom member and a horizontal right side bottom member positioned parallel to each other.

a first diagonally inclined and downwardly convergent pair of struts connection different sides of said handle bar portion with different sides of lower most portion of said frame, a traversely and horizontally oriented bar interconnection different sides of said handle bar portion, an upper load carrying portion of said frame positioned above said lower most portion and below a horizontal plane containing said handle bar portion, said upper load carrying portion comprising a horizontal left side member and a horizontal right side member positioned parallel to each other, a second diagonally inclined and downwardly convergent pair of struts connected at their upper ends to said horizontally oriented bar near different ends of said bar and with the lower ends of said second pair of struts being connected to different sides of a rear portion of said upper load carrying portion of said frame, said first diagonally inclined pair of struts each having a longitudinally axis defining a straight line containing a common plane that extends downwardly so as to be tangential with a rear portion of a circumference of said wheel, and means comprising a part of said horizontal right side and left side bottom members for mounting an axle of said wheel to said frame at a situs on said frame above said lowermost portion of said frame so as to provide said cart with a low center of gravity.

6. The cart of claim 5 in combination with:

a waist band extending transversely and horizontally between a rear facing vertical surface of each of said handle bars, and means for affixing the ends of said waist band to said rear facing surface of each of said handle bars.

7. The cart of claim 6 wherein said means for mounting comprises a lower member on each side that is horizontally oriented and parallel to a longitudinal axis of said cart and has an upwardly formed mid portion so that the ends of said lower member are positioned below said mid-portion and are connected to front and rear portions of said frame.

8. In a cart for carrying loads and having a single ground engaging wheel and a load carrying frame having a left and a right side, said frame further comprising:

a vertically oriented bumper comprising the forward most element of said frame and positioned forward beyond a forward most extremity of said wheel, a handle bar portion of said frame positioned at the rear of said cart and comprising an uppermost level of said frame, a pair of handle bars connected to and comprising a rear part of said handle bar portion and adapted to be grasped by the hands of the user, a lower most portion of said frame comprising a left side bottom member and a right side bottom member positioned parallel to each other, said left side bottom member and said right side bottom member being essentially horizontally oriented when said handle bars are grasped by the hands of user, a first diagonally inclined and downwardly convergent pair of struts connecting different sides of said handle bar portion with different sides of said lower most portion of said frame, a traversely and horizontally oriented bar interconnecting different sides of said handle bar portion, a second diagonally inclined and downwardly convergent pair of struts connected at their upper ends to said horizontally oriented bar near different ends of said bar and with the lower ends of said second pair of struts being connected at their lower ends to different sides of an upper load carrying portion of said frame, said upper load carrying portion having a right side and a left side horizontally oriented load carrying member on opposite sides of said frame positioned above a top extremity of said wheel and oriented so as to be parallel to said left side bottom member and said right side bottom member, said first diagonally inclined pair of struts each having a longitudinal axis defining a straight line containing a common plane that extends downwardly so as to be tangential with a rear portion of a circumference of said wheel, means comprising a part of said horizontal right side and left side bottom members for mounting an axle of said wheel to said frame at a situs on said frame above said lowermost portion of said frame so as to provide said cart with a low center of gravity, a waist band extending transversely and horizontally between a rear facing vertical surface of each of said handle bars, and means for affixing the ends of said band to said rear facing surface of each of said handle bars.

9. In a cart for carrying loads and having a single ground engaging wheel and a load carrying frame having a left and a right side, said frame further comprising:

a vertically oriented bumper comprising the forward most element of said frame and positioned forward beyond a forward most extremity of said wheel, a handle bar portion of said frame positioned at the rear of said cart and comprising an uppermost level of said frame, a pair of handle bars connected to and comprising a rear part of said handle bar portion and adapted to be grasped by the hands of the user, a lower most portion of said frame comprising a horizontal left side bottom member and a horizontal right side bottom member positioned parallel to each other, a first diagonally inclined and downwardly convergent pair of struts connecting different sides of said handle bar portion with different sides of said lower most portion of said frame, a traversely and horizontally oriented bar interconnecting different sides of said handle bar portion, a second diagonally inclined and downwardly convergent pair of struts connected at their upper ends to said horizontally oriented bar near different ends of said bar and with the lower ends of said second pair of struts being connected to their lower ends to different sides of an upper load carrying portion of said frame, said first diagonally inclined pair of struts each having a longitudinal axis defining a straight line containing a common plane that extends downwardly so as to be tangential with a rear portion of a circumference of said wheel, a lower member on each side of said lower most portion that is horizontally oriented and parallel to a longitudinal axis of said cart and is upwardly formed in its mid portion so that the ends of said lower member on each side are positioned below said mid portion and are connected to front and rear portions of said frame, and a vertically oriented plate connected to a lower surface of said upwardly formed portion of each of said lower members, an axle for said wheel being connected at different ones of its ends to said plates to provide a low center of gravity for said cart, a waist band extending transversely and horizontally between a rear facing vertical surface of each of said handle bars, and means for affixing the ends of said band to said rear facing surface of each of said handle bars.

* * * * *